United States Patent Office 3,483,718
Patented Dec. 16, 1969

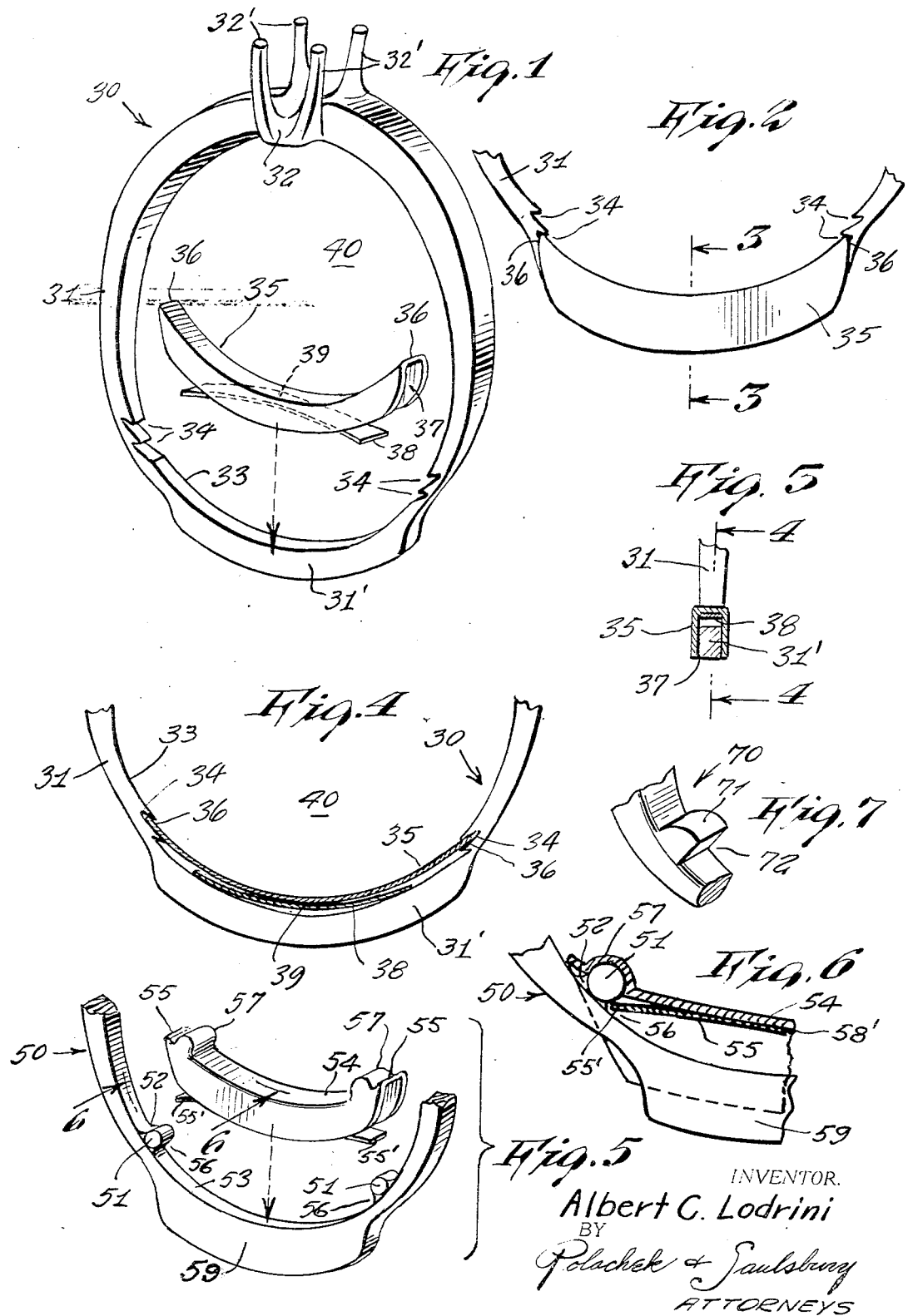

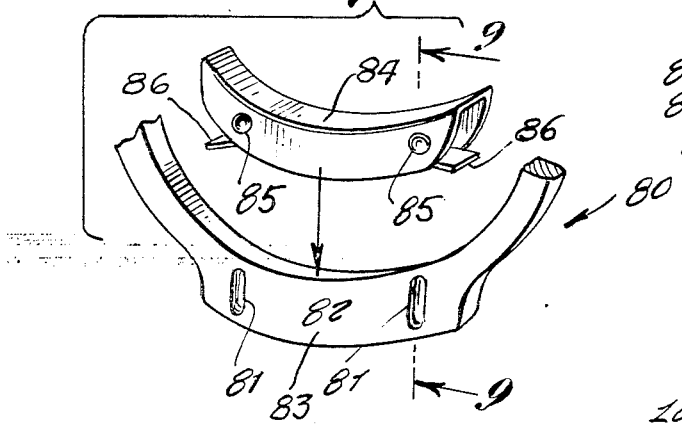
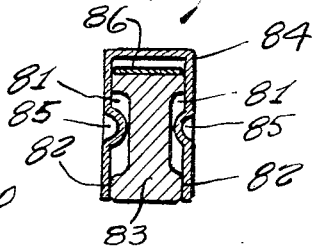
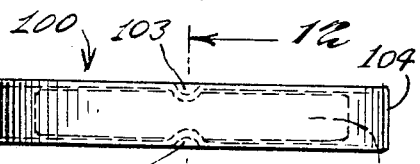
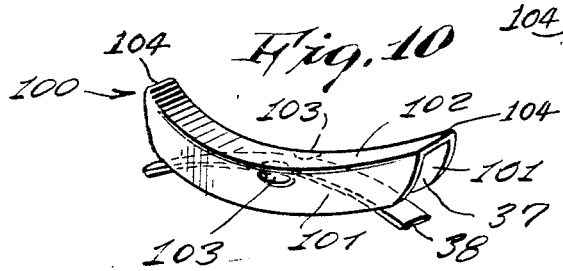
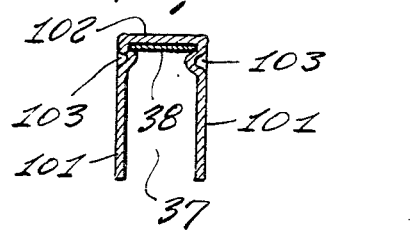

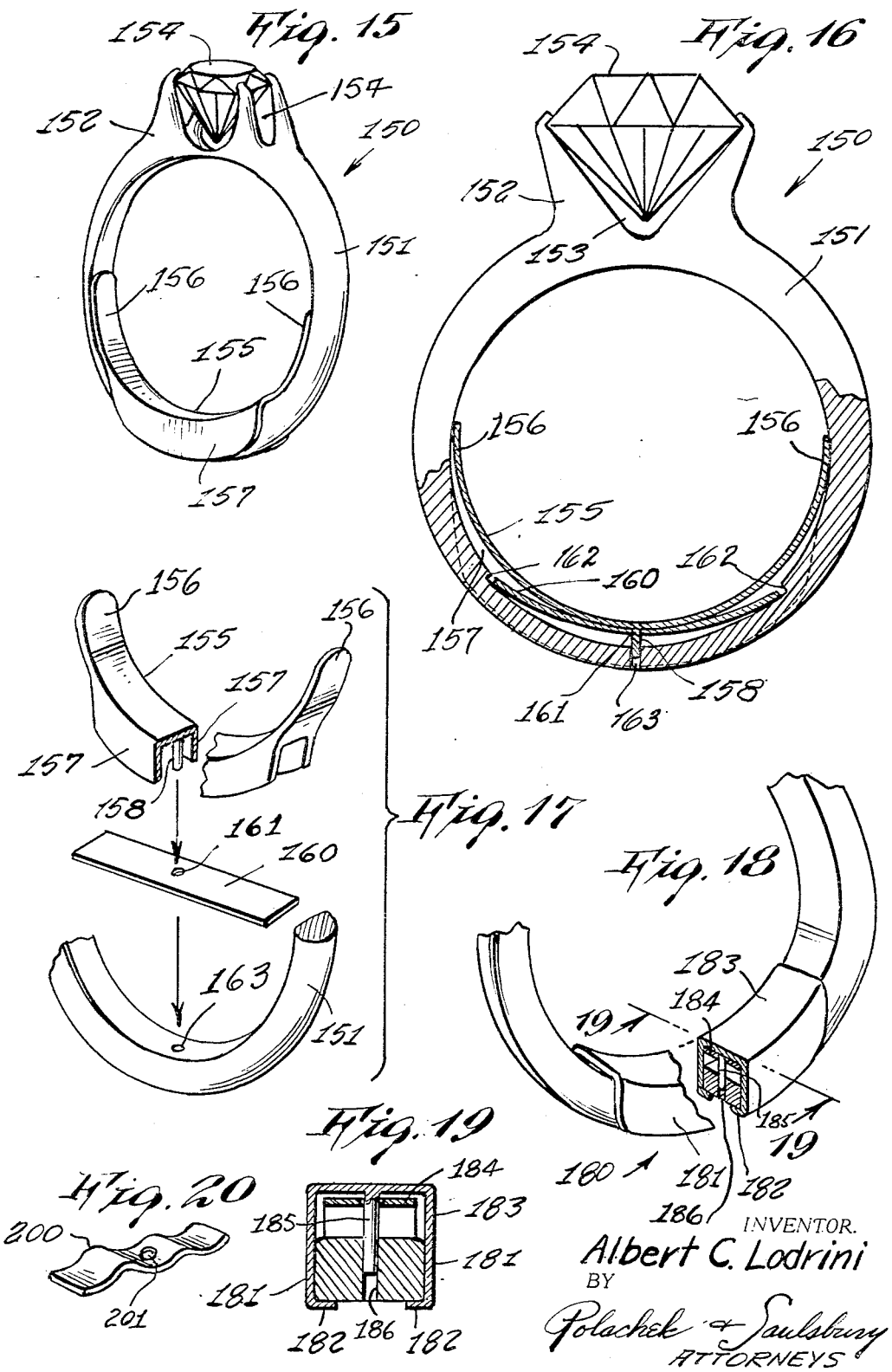

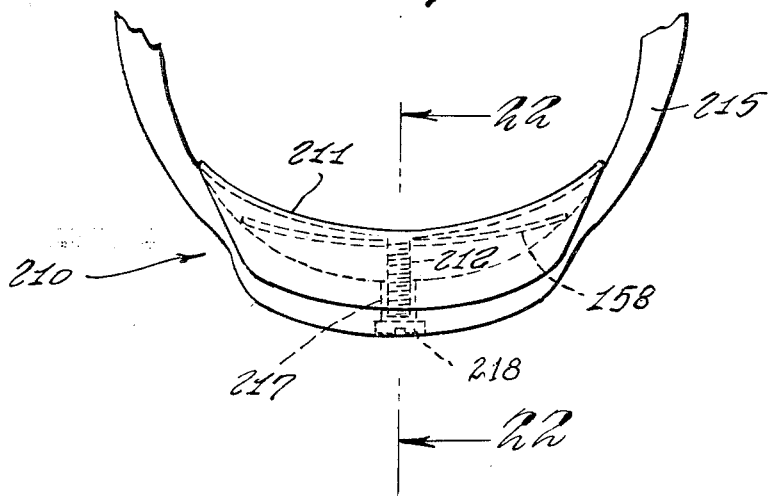
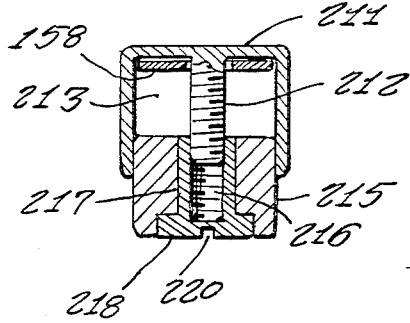
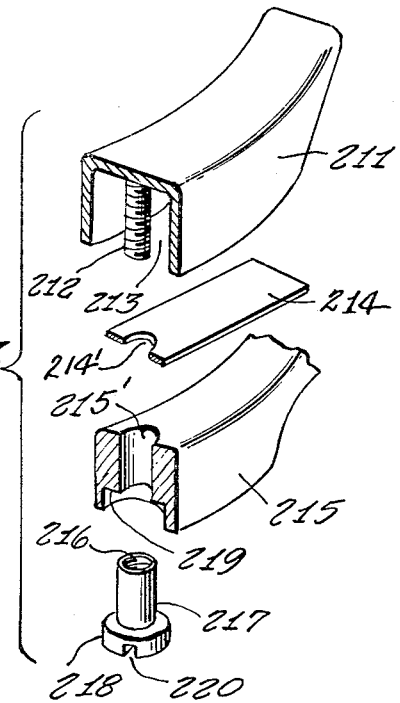
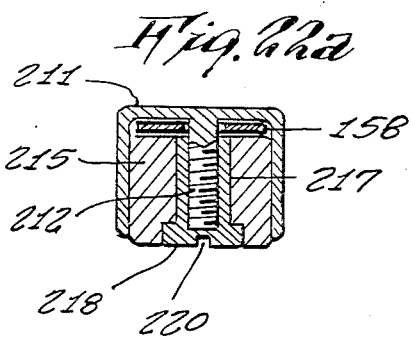

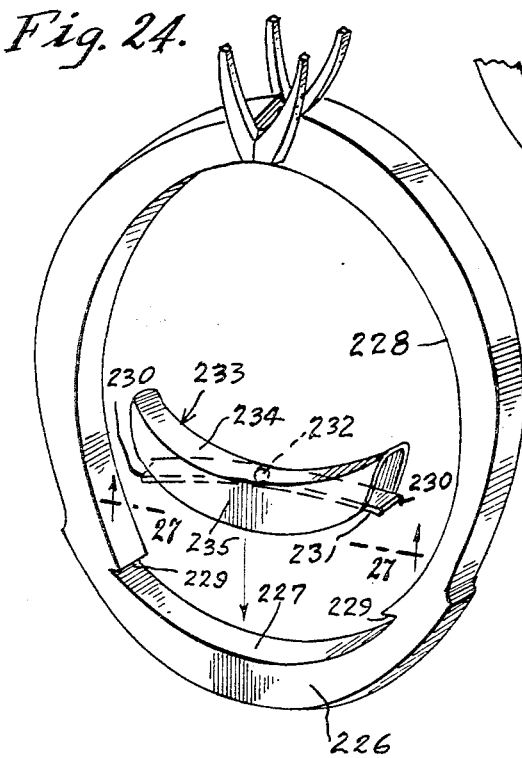
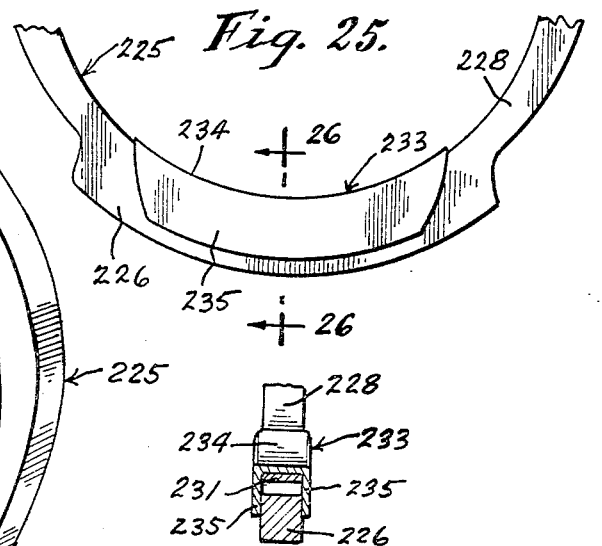
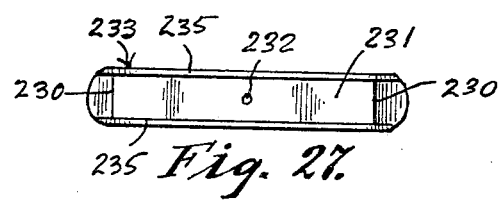
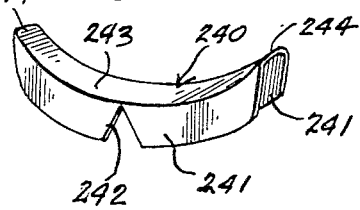
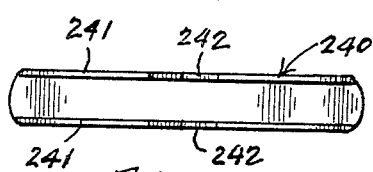
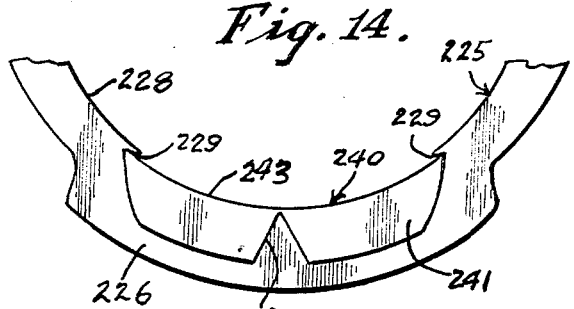

3,483,718
DEVICE FOR NARROWING THE DIAMETER
OF A FINGER RING
Albert C. Lodrini, 697 Hillcrest Road,
Westwood, N.J. 07675
Continuation-in-part of application Ser. No. 695,120
Feb. 2, 1968. This application July 30, 1968, Ser.
No. 748,864
Int. Cl. A44c 9/02
U.S. Cl. 63—15.6      9 Claims

ABSTRACT OF THE DISCLOSURE

A self-adjusting finger ring including a short saddle-like insert fitted into the ring finger opening for constricting the opening size, the saddle comprising an inwardly or outwardly movable arcuate sector of U-shaped cross-section that fits around the bottom portion of the ring and with spring therebetween. The securement of the insert is effected either by the engagement either of the ends of the insert with opposing notches in the inner edge of the ring adjacent the bottom portion or by the engagement of the ends of the leaf spring with these notches. Adjustable means is provided for controlling the spring pressure upon the finger. A shank is provided on the bottom of the ring to accommodate the sides of the insert which have flush sliding engagement therewith.

---

This invention relates to new and useful improvements in finger rings and more particularly to a finger ring having a band for preventing displacement of the ring on the finger and this application is a continuation-in-part of my copending application Ser. No. 695,120, filed Jan. 2, 1968.

An important object of the present invention is to provide a finger ring with a device for readily narrowing the diameter of the inner periphery of the band of the ring that is snap and easily attachable to the bottom portion of the ring.

Another object of the invention is to provide the main band of the finger ring with a narrowing device on the inner edge surface of the main band that will be spring biased toward the finger.

It is another object of the invention to provide in an insert for the ring of a length less than the inside diameter of the ring, means for limiting the spring-biased inward displacement thereof and at the same time means for maintaining the insert upon the ring against lateral displacement when in place upon the bottom portion of the ring.

It is a further object of the invention to provide an insert device comprising a saddle-like member and a leaf spring fixed to the underside thereof and the means for retaining the insert being notches in the sides of the ring to accommodate either ends of the member or of the spring.

It is a still further object of the invention to provide a ring with a shank bottom portion to slidably accommodate the narrowing insert.

Other objects of the invention are to provide an insert and spring combination of the above type which is of simple construction, inexpensive to manufacture, and efficient and effective in use.

BRIEF DESCRIPTIONS OF THE VIEWS OF THE DRAWINGS

FIGURE 1 is a perspective view of a finger ring and insert with the parts disengaged.

FIG. 2 is a fragmentary side view thereof with parts assembled.

FIG. 3 is a vertical and transverse sectional view taken on line 3—3 of FIG. 2.

FIG. 4 is a vertical and longitudinal sectional view taken on line 4—4 of FIG. 3.

FIG. 5 is a perspective view similar to FIG. 1 showing notches provided by short rods with the spring ends engaging the notches and bulges on the insert to accommodate the rods.

FIG. 6 is a fragmentary cross-sectional view taken on line 6—6 of FIG. 5.

FIG. 7 is a fragmentary perspective view of a modified notch providing element thereof.

FIG. 8 is a fragmentary perspective view similar to FIG. 1 showing grooves and indentation means for holding the insert upon the bottom of the ring.

FIG. 9 is an enlarged cross-sectional view taken generally on line 9—9 of FIG. 8 with the parts assembled.

FIG. 10 is a perspective view of a further saddle-like insert showing the indentation means for securing the spring upon the insert.

FIG. 11 is a top plan view thereof.

FIG. 12 is an enlarged cross-sectional view thereof taken on line 12—12 of FIG. 11.

FIG. 13 is a perspective view of a spring insert according to another form of the invention.

FIG. 14 is a fragmentary elevational view with the ring insert of FIG. 13 disposed thereon.

FIG. 14A is an enlarged bottom plan view of the insert of FIG. 13.

FIG. 15 is a perspective view showing the auxiliary band overlying a spring and with the ends of the spring engaging retaining notches.

FIG. 16 is a side view thereof with portions broken away and shown in section.

FIG. 17 is an exploded perspective view thereof showing the auxiliary band, spring plate and a fragment of the main band unassembled.

FIG. 18 is a fragmentary perspective view of an insert retained by bending inwardly the flanges of the insert.

FIG. 19 is a vertical sectional view taken on line 19—19 of FIG. 18.

FIG. 20 is a perspective view of a compound curved leaf spring that can be used in lieu of the flat leaf spring.

FIG. 21 is a fragmentary side elevational view of an insert assembly with an adjustable screw means for limiting the inward spring movement.

FIG. 22 is an enlarged sectional view taken on the line 22—22 of FIG. 21.

FIG. 22a is a similar sectional view to FIG. 22 showing the device in a further adjusted position, and FIG. 23 is an exploded perspective view of the components of the assembly of FIG. 21, and shown partly in cross section.

FIG. 24 is a perspective view of a finger ring and insert disengaged therefrom according to a still further form of the invention.

FIG. 25 is a fragmentary elevational view with the insert thereof engaged.

FIG. 26 is a fragmentary vertical sectional view taken on line 26—26 of FIG. 25.

FIG. 27 is a bottom plan view of the insert as viewed in line 27—27 of FIG. 24.

DETAILED DESCRIPTION OF THE DRAWINGS

Referring now to FIGS. 1 to 4, a finger ring is designated generally at 30. This ring 30 has a circular solid main band 31 with an enlarged head portion 32 at the top that is formed with prongs 32' which form a seat for supporting a precious stone or other decorative object, and flattened shank or bottom portion 31' of uniform thickness at the bottom thereof. Just above the shank and in inner edge 33 of the ring are two pairs of opposing notches 34, one pair above the other. A short saddle-like insert 35 of U-shaped cross section and of arcuate shape is fitted against the inner edge 33 of shank portion 31'. This insert 35 has opposite end edges 36, each of which is selectively engageable within one of the notches 34 in each of the pairs of notches to hold the insert in place upon the bottom portion 31. The saddle-insert includes a central opening 37 within which a downwardly curved leaf spring 38 is centrally secured by a weld 39 or other suitable means and to urge the insert end edges 36 against a pair of notches 34 and the insert against the finger of the wearer in a spring-pressed or biased manner. The insert for the lower notches as shown is smaller than an insert that would be used with the upper notches. These same pairs of notches can be used for snappingly receiving the leaf spring ends in a manner to be described in connection with other forms of the invention.

To assemble the parts, a wearer of the ring merely fits the saddle-like insert 35 over the inner edge 33 and then forces down to engage the notches. The spring 38 bears pressure between the shank portion 31' and the saddle-insert so as to prevent rattle or looseness there-between and to hold the insert against the notches. The notches 34 above and below can be cut to accommodate the same length insert and extend between notches either above or below.

In a modified construction shown in FIGS. 5 and 6, a ring 50 has short cylindrical rods 51 secured by a weld 52 in spaced apart relation on inner edge 53 of the ring providing thereby inwardly extending projection on the inner edge of the ring band. A saddle like insert 54 is securable to the ring by means of spring ends 55' of spring snapping into the notches 56 formed by the inner edges 53 of the ring band and the short rods 51.

The saddle-insert 54 has upwardly-extending bulges 57 at opposite ends thereof to accommodate the respective rods 51 while leaf spring 55 connected by a weld 58' to the underside of the insert 54, maintains the insert in place upon shank portion 59 on the bottom of the ring and also bear against the wearer's finger to prevent rotation of the ring upon the finger. Accordingly, it is only necessary to spring ends 55' of the spring 55 over the short rods 51 to locate and hold the insert 54 upon the shank or bottom portion 59 of the ring 50. The spring ends 55 disposed in the notches 56 and engaging with the underside of the short rods 51 will keep the insert upon the ring 55 and will force it against the underside of the finger with such pressure as to keep the ring in place and against turning upon the wearer's finger.

In FIG. 7, a ring 70 is slightly varied by having a quadrant shaped formation 71 integrally formed on the inner edge of the ring band, the formation thereby providing an inwardly extending projection thereupon and a notch 72 into which the spring 55 of ends of insert 54 may be snapped down for mounting the insert 54 upon the ring 70 to function for the above purpose of holding the ring upon the wearer's finger.

In FIGS. 8 and 9, a ring 80 includes a pair of parallel spaced apart closed end vertical slots 81, 81 on opposite side faces 82 of shank portion 83 of the ring band 80, and a saddle-insert 84 on each side thereof, a pair of equally-spaced apart indentations 85 operable in the slots 81 of the shank or bottom portion 83 to keep the insert in place thereof but to allow vertical adjustment of the insert to the finger against the action of a leaf spring 86 bearing against the inner edge of the ring and so that the ring will grip the finger.

In FIGS. 10 to 12, a saddle-insert 100 comprises depending side walls 101 interconnected by arcuate wall 102 so to form the channel space 37 as in the form shown in FIG. 1 into which leaf spring 38 is fitted, and instead of being welded to the insert is secured to the saddle by means of indentations 103 in side walls 101 so to frictionally press the leaf spring against the interconnecting wall 102 and to hold the same against lateral rotational displacement. Ends 104 of insert 102 will be forced into and engage notches 34 in the edge 33 of the ring 30 of FIG. 1, the width of the insert used depending upon the size of the wearer's finger. One insert for the upper notches and one smaller size for the lower notches. All of the inserts are of a length substantially less than the diameter of the inner diameter of the ring.

In FIGS. 15 to 17, a finger ring 150 has a main band 151 with enlarged head portion 152 at the top formed with a recess 153 to retain diamond or stone 154 therein. This ring 150 while having an inner edge is without a shank portion. An auxiliary band or insert 155 is fitted on the bottom of the band for the same purpose as the other inserts. This band is arcuate-shaped and curved to provide long side ends as 156, 156. The band also has depending opposing flanges 157, 157 that saddle the ring bottom. A pin 158 rigidly depends from the insert body midway its ends and hidden from view by the depending flanges 157. An elongated perforated leaf spring metal plate 160 is mounted on the pin 158, this pin extending through a perforation 161 therein, positioning the spring plate 160 between the flanges 156 of the insert to hold to hold the same against lateral displacement relative thereto. The main band 151 along its bottom portion is reduced in thickness forming shoulders 162 in the inner edge surface thereof. The spring plate 160 seats on this reduced portion when in operative position on the pin 158 and urges the saddle insert 155 inwardly of the ring. The pin 158 on the insert projects through a hole 163 in the bottom portion of the main band 151 to stabilize further the insert 155 on the band 151 against rotational displacement thereupon.

In use, the spring plate 160 urges the auxiliary band 155 inwardly against the finger and the finger of the wearer reacts by pushing the pin 158 through the hole 163 on the band 151.

In FIGS. 18 and 19, a finger ring insert 180 has opposing side flanges 181 that have their long free edges turned in forming inwardly bent portion 182 for holding saddle insert 183 in position against the action of a leaf spring 184 carried on a depending pin 185 stayed in hole 186 in the bottom of the ring. This saddle insert 183 is channel-shaped with no end extensions.

In FIG. 20, a compound curved leaf spring 200 is shown which may be used instead of the flat leaf springs as above described. A vertical spring of Z-shape, coil or any other suitable configuration may be used upon the depending insert pin. This leaf spring 200 can have a hole 201 adapted to receive the depending pins of the inserts.

In FIGS. 21 to 23, there is a ring assembly 210 which includes a saddle insert 211 having a downwardly-extending threaded pin or stud 212 integral therewith and located within the channel space 213 of the insert. This threaded stud 212 extends through clearance opening 215' of the bottom shank portion ring 215, and is engaged within threaded opening 216 of an internally threaded sleeve 217 inserted from the underside of the ring through opening 214' in leaf spring 214. This sleeve 217 has an enlarged head 218 which rests against a counter bore shoulder 219 within the ring shank portion 215 so that the head is flush with the outer edge ring surface. The head is provided with a screw driver slot 220 so as to permit manual rotation of the stud within the opening 214, and thus cause the saddle insert 211 to be adjustably drawn toward or away from the sleeve 217 and shank 215. This form of the invention differs from the structure illustrated in FIG. 17 by providing a tension control against the wearer's finger.

In FIGS. 24 to 27, there is shown the preferred form of this invention, A main ring 225 of varying thickness is provided with a flat side depressed or depending shank formation 226 on the bottom portion and undercut as indicated at 227 into inner edge 228 of the ring and providing retaining notches 229 at the ends of the undercut for receiving ends 230 of a downwardly curved leaf spring 231 secured intermediate or midway its length as by welding or any other means indicated at 232 to the underside of the top wall of a saddle insert 233 curved on its upper surface 234 to conform to and provide a continuation of the inner periphery edge 228 of the ring 225. The securement of the spring 231 is made midway of the ring of the surface 234 of the insert 233 so that upon the insert being pressed downwardly into the undercut, the ends of the leaf spring 230 will ride over the inner ring edge surface and snap into the notches 229 in such a manner as to retain the insert against radial inwardly disengagement or displacement from the ring. The insert 233 being connected to the spring is placed under compression to clamp the finger whereby to hold the ring against rotation upon the finger. The spring can be of any strength depending upon the gripping action desired and its size, depending upon the size of the ring and the notches located for best operation. The insert itself is constructed in such a manner to fit the ring. The side wall flanges 235 will slide over the outer faces of the shank formation 226 so as to keep the insert in place upon the ring against twisting over the bottom portion. One will feel a cushioning effect when the ring is upon the finger and pressure against the underside of the finger. If the insert 233 is to be removed it can easily be done by removing the ring from the finger and pulling radially inwardly on the insert to pull the ends 230 of the spring 231 to unsnap out of the notches 229 of the undercut 227.

In FIGS. 13 to 14a, the saddle-like insert itself has been constructed of spring material and the spring such as used in the other forms of the invention has been eliminated and thus providing a form in which the insert and spring are combined into one member. A saddle-like insert 240 is provided in which its opposite side wall flanges 241, 241 have been cut away or notched midway its length as indicated at 242 to allow flexing of its upper curved surface or interconnecting top wall 243 in order that its ends 244, 244 can readily be pushed downwardly over the inner peripheral edge 228 of the ring and into notches 229 of the undercut 227 and into place within the undercut and allowed to expand upwardly by virtue of this springiness of the surface 243 so that a pressure resulting from the springiness of the top wall 243 the insert will engage the finger to clamp the ring upon the finger. In FIG. 14, the insert 240 is depressed as when upon the wearer's finger but is less curved when the ring is free of the finger.

The notches 242 allow for the expansion or contraction of the spring surface or top wall 243 while allowing the flanges 241 to hold the insert in place upon the shank formation 226. The insert 240 can be removed in the same manner as by slight pull inwardly that the insert 233 is removed from the ring.

It should be apparent in all of the forms of the invention that with this construction the length of the insert and its spring is much less than the inner edge diameter of the ring and that the insert is confined only to the deep bottom portion of the ring under the inside of the finger and not viewable from the side of the finger. Since the insert stretches only across the deep bottom portion of the ring, this insert can readily be used with rings of varying thickness with small bottom portions and large top portions, such as of the signet type as well as upon the wedding ring of uniform thickness.

What is claimed is:

1. In combination, a finger ring formed of a circular main band having top and bottom portion and an inner edge therewithin, a saddle-like insert of arcuate shape fitted over the bottom portion of the ring band and having side walls and an upwardly curved top wall interconnecting the opposite side walls, said insert interconnecting wall having opposite end edges, a downwardly curved leaf spring secured midway its length within the insert and to the underside of the insert interconnecting wall and having depending ends, both said insert walls and said leaf spring in length from end to end being less than the diameter of the inner edge of the ring, said ring band within its inner edge and adjacent the bottom portion thereof having a pair of opposing notches adapted to snappingly receive either the opposite end edges of the insert interconnecting wall or the depending ends of the downwardly curved leaf spring, whereby said insert is biasingly retained on the bottom portion of the ring against radially inward and lateral rotational displacement relative thereto while effecting clamping action of the ring upon a wearer's finger.

2. The combination as defined in claim 1, wherein the ring band includes a further pair of opposing notches in the inner ege of the ring band just above the first mentioned pair of notches and adapted to snappingly receive a greater length insert or leaf spring when fitted upon the bottom portion of the ring.

3. The combination as defined in claim 1, wherein said depending leaf spring ends are snappingly received in the notches and said bottom portion including a depending flat sided shank formation, said notches being within said shank formation and said insert side walls being slidable over the shank formation.

4. The combination as defined in claim 1 and said notches being provided by inwardly extending projections secured to the inner edge of the band, said insert interconnecting wall having bulge portions adjacent the respective ends of the insert and respectively receiving the projections on the inner edge of the band upon the spring ends engaging the underside of the projections.

5. In a self-adjusting finger ring formed of a circular main band having top and bottom portions and inner edge, said band defining a central opening for a wearer's finger in combination with a saddle-like insert having top and side walls adapted to be fitted over the bottom portion of the ring band, and means coacting between the insert and ring band for restraining and limiting radial inward and outward adjustable and lateral rotational movement of said saddle insert upon said ring bottom portion, said bottom portion of the ring includes a depending flat sided shank formation, said coacting means including a pair of parallel vertically extending slots on each side of the shank formation, indentations in the sides of the insert cooperating respectively with the respective slots in the shank formation, and a spring disposed between the insert and the bottom portion to bias the insert toward the central opening.

6. In a self-adjusting finger ring formed of a circular main band having top and bottom portions and inner edge, said band defining a central opening for a wearer's finger in combination with a saddle-like insert having top and side walls adapted to be fitted over the bottom portion of the ring band, and means coacting between the insert and ring band for restraining and limiting radial inward and outward adjustable and lateral rotational movement of said saddle insert upon said ring bottom portion, and leaf spring disposed under the insert, said coacting means for restraining the insert including shoulders in the edge of the ring for receiving the end of the spring, said bottom portion having a small central hole, and a pin projecting from the insert through the spring and into the small central hole in the bottom portion.

7. In a self-adjusting finger ring formed of a circular main band having top and bottom portions and inner edge, said band defining a central opening for a wearer's finger in combination with a saddle-like insert having top and side walls adapted to be fitted over the bottom portion of the ring band, and means coacting between the insert and ring band for restraining and limiting radial inward and outward adjustable and lateral rotational movement of said saddle insert upon said ring bottom portion, a leaf spring disposed under the insert, said coacting means including a pin depending from the underside of the insert, said bottom portion having a central hole, said pin extending downwardly through said spring and into said hole, and the side portions of the insert bent under the bottom portion to limit the inward movement of the insert into the central hole against the action of said spring.

8. In a self-adjusting finger ring formed of a circular main band having top and bottom portions and inner edge, said band defining a central opening for a wearer's finger in combination with a saddle-like insert having top and side walls adapted to be fitted over the bottom portion insert and ring band for restraining and limiting radial inward and outward adjustable and lateral rotational tion of the ring band, and means coacting between the movement of said saddle insert upon said ring bottom portion, and a leaf spring disposed under the insert and said coacting means including a threaded pin depending from the insert and through the spring, said bottom portion of the rim and band having a central hole receiving said pin, and a headed internally-threaded sleeve operable in the central hole and upon the threaded pin to adjustably limit inward movement of the insert toward the central opening against the action of the spring.

9. In a self-adjusting finger ring formed of a circular main band having top and bottom portions and inner edge, said band defining a central opening for a wearer's finger in combination with a saddle-like insert having top and side walls adapted to be fitted over the bottom portion of the ring band, and means coacting between the insert and ring band for restraining and limiting radial inward and outward adjustable and lateral rotational movement of said saddle insert upon said ring bottom portion, said saddle-like insert having its side walls notched intermediate the length of the insert and upwardly to the top wall, said insert including the top wall being formed of spring material, said coacting means comprising a flat-sided depressed shank formation in the bottom portion of the main ring band providing a cutaway recess with notches and the opposite ends thereof snap receiving the end edges of the top wall of the insert, said side walls of the insert being slidable over flat side face of the shank formation.

References Cited
UNITED STATES PATENTS

| | | | |
|---|---|---|---|
| 1,075,673 | 10/1913 | Segman | 63—15.6 |
| 1,442,738 | 1/1923 | Seeler | 63—15.6 |
| 3,214,939 | 11/1965 | Monahan | 63—15.6 |
| 3,237,426 | 3/1966 | Doering | 63—15.6 |
| 3,360,959 | 1/1968 | Schechter et al. | 63—15.6 |

ROBERT PESHOCK, Primary Examiner